US011999324B2

(12) United States Patent
Froland (10) Patent No.: US 11,999,324 B2
(45) Date of Patent: Jun. 4, 2024

(54) WHEEL ASSEMBLIES, APPARATUSES, AND RELATED METHODS FOR A KNEELING VEHICLE OR TRAILER CHASSIS

(71) Applicant: Andrew Froland, Lamont (CA)

(72) Inventor: Andrew Froland, Lamont (CA)

( * ) Notice: Subject to any disclaimer, the term of this patent is extended or adjusted under 35 U.S.C. 154(b) by 240 days.

(21) Appl. No.: 17/368,591

(22) Filed: Jul. 6, 2021

(65) Prior Publication Data

US 2022/0001842 A1    Jan. 6, 2022

(30) Foreign Application Priority Data

Jul. 6, 2020  (CA) ..................................... 3085887

(51) Int. Cl.
*B60S 9/04*       (2006.01)
*B60P 1/02*       (2006.01)

(52) U.S. Cl.
CPC ................. *B60S 9/04* (2013.01); *B60P 1/027* (2013.01)

(58) Field of Classification Search
CPC .................................. B60S 9/04; B60P 1/027
See application file for complete search history.

(56) References Cited

U.S. PATENT DOCUMENTS

| | | | |
|---|---|---|---|
| 2,469,506 A | 5/1946 | Kerr | |
| 2,879,072 A | 3/1956 | Rear | |
| 2,867,444 A | 1/1959 | Henning | |
| 2,886,338 A * | 5/1959 | French | B60P 1/08 280/40 |
| 3,912,038 A * | 10/1975 | Bernaerts | B60V 1/115 180/128 |
| 4,230,340 A | 10/1980 | Wasservogel | |
| 4,718,875 A | 1/1988 | McKittrick | |
| 4,746,142 A | 5/1988 | Davis | |

(Continued)

FOREIGN PATENT DOCUMENTS

| | | |
|---|---|---|
| DE | 926527 | 4/1955 |
| DE | 102017211949 | 1/2019 |

(Continued)

OTHER PUBLICATIONS

Dexter Axle, Trailer Running Gear, Accessed Feb. 8, 2019, 123 pages.

(Continued)

*Primary Examiner* — Frank B Vanaman
(74) *Attorney, Agent, or Firm* — Robert A. Nissen (57) ABSTRACT

An apparatus has: a chassis; wheel assemblies at opposed sides of the chassis, each wheel assembly having: a ground engaging wheel; a wheel mount; a control arm pivotally connected between the wheel mount and the chassis; and an actuator pivotally connected between the wheel mount of the ground engaging wheel and the chassis; in which the actuator is operable to, in use, cause the ground engaging wheel to: pitch down with increasing camber from an upright position into a facedown position to lower the chassis; and pitch up with decreasing camber from the facedown position into the upright position to raise the chassis. A method involves lowering the chassis by operating the actuators to pitch the ground engaging wheels down into the facedown position; and raising the chassis by operating the actuators to pitch the ground engaging wheels up into the upright position.

20 Claims, 6 Drawing Sheets

(56) References Cited

U.S. PATENT DOCUMENTS

| | | | | |
|---|---|---|---|---|
| 5,137,297 | A * | 8/1992 | Walker | B60S 9/10 |
| | | | | 280/475 |
| 5,161,814 | A | 11/1992 | Walker | |
| 5,257,671 | A | 11/1993 | Watkins | |
| 6,062,578 | A | 5/2000 | Richardson | |
| 6,073,946 | A | 6/2000 | Richardson | |
| 6,199,876 | B1 | 3/2001 | Eckelberry | |
| 6,263,801 | B1 | 7/2001 | Eckelberry | |
| 6,286,857 | B1 | 9/2001 | Reese | |
| 6,349,952 | B1 | 2/2002 | Kallstrom | |
| 6,416,069 | B1 | 7/2002 | Ramsey | |
| 6,428,026 | B1 | 8/2002 | Smith | |
| 6,520,521 | B2 | 2/2003 | Mayfield | |
| 6,585,285 | B2 | 7/2003 | Koch | |
| 6,679,517 | B2 | 1/2004 | Proia | |
| 6,692,014 | B1 | 2/2004 | Grosso | |
| 6,834,874 | B1 | 12/2004 | Overby | |
| 6,851,734 | B2 | 2/2005 | Findley | |
| 6,921,098 | B2 | 7/2005 | VanDenberg | |
| 7,243,979 | B1 | 7/2007 | Stene | |
| 7,322,864 | B2 * | 1/2008 | Longdill | B60F 3/0038 |
| | | | | 440/12.5 |
| 7,464,948 | B2 | 12/2008 | Ramsey | |
| 7,537,219 | B1 | 5/2009 | Sherwood | |
| 7,568,710 | B2 | 8/2009 | Ramsey | |
| 7,775,529 | B2 | 8/2010 | Kinkaide | |
| 7,918,465 | B2 | 4/2011 | Metzger | |
| 7,934,734 | B2 | 5/2011 | Billian | |
| 7,938,416 | B2 | 5/2011 | Legros | |
| 7,950,678 | B1 | 5/2011 | Bauder | |
| 8,033,565 | B2 | 10/2011 | Holroyd | |
| 8,191,922 | B2 | 6/2012 | Gabourie | |
| 8,235,403 | B2 | 8/2012 | VanDenberg | |
| 8,267,410 | B1 | 9/2012 | Stutz | |
| 8,282,115 | B2 | 10/2012 | Stephani | |
| 8,342,556 | B2 | 1/2013 | Oriet | |
| 8,360,448 | B2 | 1/2013 | Lariviere | |
| 8,668,426 | B1 | 3/2014 | Baron | |
| 8,696,012 | B2 | 4/2014 | Oyasaeter | |
| 8,720,938 | B2 | 5/2014 | Ehrlich | |
| 8,783,701 | B1 | 7/2014 | Blevins | |
| 8,925,934 | B2 | 1/2015 | Anderson | |
| 9,340,087 | B2 | 5/2016 | Atkinson | |
| 9,346,388 | B2 | 5/2016 | Aamodt | |
| 9,545,866 | B2 | 1/2017 | Woods, Sr. | |
| 9,623,780 | B2 | 4/2017 | Pratt | |
| 9,725,024 | B1 | 8/2017 | Davis | |
| 9,776,667 | B2 | 10/2017 | Hill | |
| 9,776,677 | B2 | 10/2017 | Yakimishyn | |
| 9,828,026 | B2 | 11/2017 | Behrens | |
| 9,834,055 | B2 | 12/2017 | Joachim | |
| 9,994,270 | B2 | 6/2018 | Blevins | |
| 10,000,145 | B2 | 6/2018 | Woods | |
| 10,232,758 | B1 | 3/2019 | Davis | |
| 10,252,593 | B2 | 4/2019 | Fida | |
| 10,336,152 | B1 | 7/2019 | Cook, Jr. | |
| 10,343,736 | B2 | 7/2019 | Yoder | |
| 2010/0066041 | A1 * | 3/2010 | Metzger | B60P 1/027 |
| | | | | 280/423.1 |
| 2012/0009054 | A1 * | 1/2012 | Kun | B60S 9/04 |
| | | | | 280/47.131 |
| 2017/0327207 | A1 | 11/2017 | Sierra | |
| 2018/0319238 | A1 | 11/2018 | Denton | |
| 2019/0016445 | A1 | 1/2019 | Clark | |
| 2019/0193870 | A1 * | 6/2019 | Xiang | B64F 1/305 |

FOREIGN PATENT DOCUMENTS

| | | |
|---|---|---|
| EP | 3486098 | 5/2019 |
| FR | 2679510 | 4/1996 |
| FR | 2850944 | 8/2004 |
| FR | 2863246 | 1/2006 |
| FR | 2873978 | 12/2007 |
| GB | 2436319 | 9/2007 |

OTHER PUBLICATIONS

Fassi, Micro Serie, Published Feb. 2015, 16 pages.
Grote, Stop/Tail/Turn Lamps, Published 2016, 30 pages.
Honda, GX240-270-340-390 Owner's Manual, Published 2010, 60 pages.
Honda, GX340 and GX390 Web page, Accessed Mar. 8, 2019, 4 pages.
Honda, Gx 340 Horizontal shaft gasoline (petrol) engine, Published Sep. 2017, 4 pages.
Celtic Distributors Ltd., Honda 2018 Price List, Published Feb. 1, 2018, 12 pages.
Hy-Spec Hydraulik, Hydraulic Cylinders, Published Feb. 5, 2014, 24 pages.
Schroeder Industries, Products Catalog, Published 2017, 120 pages.
Spotton, R Series Cylinders, Accessed Feb. 7, 2019, 16 pages.
Airbagged Trailers, Airbagged Trailers Introduction Video, published Jul. 1, 2013, 1 page, URL = https://www.youtube.com/watch?v=Ikzm_4Adz3U.
Outsidescrewball, Short Screw—Hydraulic Drop Trailer, published Sep. 24, 2016, 1 page, URL = https://www.youtube.com/watch?v=A7UStj2iiMk.
Airtowtrailers, Loading Safes with an Air-tow Trailer, published Nov. 29, 2010, 1 page, URL = https://www.youtube.com/watch?v=eowCcsXdEYQ.

\* cited by examiner

WHEEL ASSEMBLIES, APPARATUSES, AND RELATED METHODS FOR A KNEELING VEHICLE OR TRAILER CHASSIS

TECHNICAL FIELD

This document relates to wheel assemblies, apparatuses, and related methods for a kneeling vehicle or trailer chassis.

BACKGROUND

The following paragraph is not an admission that anything discussed in it is prior art or part of the knowledge of persons skilled in the art.

Trailers and vehicles may be provided with pivoting wheels that swing on swing arms from a vertical, deployed position to a flat, stowed position under the trailer and/or vehicle chassis. It is also known to provide wheels that lift off the ground.

SUMMARY

An apparatus is disclosed comprising: a chassis; wheel assemblies at opposed sides of the chassis, each wheel assembly having: a ground engaging wheel; a wheel mount; a control arm pivotally connected between the wheel mount and the chassis; and an actuator pivotally connected between the wheel mount of the ground engaging wheel and the chassis; in which the actuator is operable to, in use, cause the ground engaging wheel to: pitch down with increasing camber from an upright position into a facedown position; and pitch up with decreasing camber from the facedown position into the upright position.

A method of operating an apparatus is disclosed, the method comprising: lowering a chassis by operating actuators to pitch the ground engaging wheels down into a facedown position; and raising the chassis by operating the actuators to pitch the ground engaging wheels up into an upright position.

A method of operating an apparatus is disclosed, the method comprising: operating actuators to pitch ground engaging wheels, mounted to a chassis, down into a facedown position; and operating the actuators to pitch the ground engaging wheels up into an upright position.

A wheel assembly for a chassis is disclosed, comprising: a ground engaging wheel; a wheel mount; a control arm pivotally connected between the wheel mount and a control arm chassis mount; and an actuator pivotally connected between the wheel mount of the ground engaging wheel and an actuator chassis mount; in which the actuator is operable to cause the ground engaging wheel to: pitch down with increasing camber from an upright position into a facedown position; and pitch up with decreasing camber from the facedown position into the upright position.

A method is disclosed comprising: lowering a chassis, which has a pair of ground engaging wheels mounted at opposed sides of the chassis, with each ground engaging wheel mounted in cantilever fashion to the chassis by a control arm and an actuator, in which lowering comprises operating the actuators to pitch the ground engaging wheels down into the facedown position; and raising the chassis by operating the actuators to pitch the ground engaging wheels up into the upright position.

In various embodiments, there may be included any one or more of the following features: The actuator is operable to, in use, cause the ground engaging wheel to: pitch down with increasing camber from the upright position into the facedown position to lower the chassis; and pitch up with decreasing camber from the facedown position into the upright position to raise the chassis. For each wheel assembly, the control arm and the actuator pivotally connect to the wheel mount via a closed chain linkage mounted to the wheel mount. For each wheel assembly, the closed chain linkage comprises a four bar linkage forming a folding quadrilateral. For each wheel assembly, the control arm pivotally connects to a joint of the four bar linkage. For each wheel assembly, the actuator pivotally connects to an actuator crank stem extended from a link of the four bar linkage. The four bar linkage is formed by the wheel mount, an elongate link, and a pair of bridge links pivotally connecting the elongate link to float relative to the wheel mount. For each wheel assembly, the control arm forms a crank that pivotally connects to the wheel mount to define a control arm joint of the four bar linkage, with a cam stem of the crank forming one of the pair of bridge links and pivotally connecting to the elongate link. For each wheel assembly, the actuator pivotally connects to a crank stem of the elongate link. For each wheel assembly: the actuator pivotally connects to the wheel mount at an actuator connection point at or near a base end of the wheel mount below a central spin axis of the wheel when in the upright position; and the control arm pivotally connects to the wheel mount at a control arm connection point above the actuator connection point and below the central spin axis of the wheel when in the upright position. The apparatus is structured such that the ground engaging wheels contact a ground surface and bear a weight of the chassis when pitching between the facedown position and the upright position. The apparatus forms a vehicle. The apparatus forms a trailer, in which the chassis mounts a trailer deck. The ground engaging wheels are structured to remain under the trailer deck when in both the upright position and the facedown position. A ramp at a side or end of the trailer deck. Each wheel assembly is mounted to the chassis independent of the other wheel assemblies. The control arm and actuator depend from an intermediate position, between the opposed sides of, and under, the chassis, and extend laterally outward from the intermediate position, in both the upright and facedown positions, to mount and connect to the wheel mount. Each wheel assembly is structured such that: when moving from the upright position to the facedown position, respective wheel mounting ends of the control arm and actuator pitch up toward the chassis; and when moving from the facedown position to the upright position, the respective wheel mounting ends of the control arm and actuator pitch down away from the chassis. Each wheel assembly is structured such that when moving from the upright position to the facedown position a central camber axis, of the ground engaging wheel, that is defined parallel with a direction of travel of the chassis, travels relatively up toward the chassis and laterally outward while the wheel pitches with increasing camber. The chassis mounts a trailer deck. Lowering further comprises lowering to tilt a rear end of the chassis down relative to a front of the chassis. Lowering or raising comprises lowering or raising to tilt a side or end of the chassis down or up, respectively. Actuating the system (lowering or raising a wheel relative to the chassis) further comprise one or more of: tilting the chassis from side to side (raising or lowering a side); or tilting the chassis from end to end (raising or lowering a end); or raising or lowering the chassis evenly; or any combination of the above at once". The trailer deck is adjacent an external platform, and in which lowering or raising further comprises lowering or raising the trailer deck to a top surface of the platform.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

A trailer may be an unpowered vehicle towed by a powered vehicle (tow vehicle). It is commonly used for the transport of goods and materials. Sometimes recreational vehicles, travel trailers, or mobile homes with limited living facilities where people can camp or stay have been referred to as trailers. In earlier days, many such vehicles were towable trailers.

Some trailers are made for personal (or business) use with practically any powered vehicle having an appropriate hitch, but some trailers are part of large trucks called semi-trailer trucks for transportation of cargo. Enclosed toy trailers and motorcycle trailers may be towed by commonly accessible pickup truck or van, which generally require no special permit beyond a regular driver's license. Specialized trailers such as open-air motorcycle trailers, bicycle trailers may be smaller and accessible to small automobiles, as are some simple trailers, pulled by a drawbar and riding on a single or dual set of axles. Other trailers, such as utility trailers and travel trailers or campers come in single and multiple axle varieties, to allow for varying sizes of tow vehicles. There also exist highly specialized trailers, such as genset trailers, pusher trailers and their ilk that are also used to power the towing vehicle. Others are custom-built to hold entire kitchens and other specialized equipment used by carnival vendors. There are also trailers for hauling boats.

A trailer may be structured to lower or tilt. Such trailers may be referred to as collapsible, folding, or kneeling trailers. Collapsible or folding motorcycle trailers are available to overcome storage problems that might prevent use of a non-collapsible trailer, some such trailers are sufficiently compact to allow the user to carry the trailer in the trunk of a car when not in use.

An example of a lowering or tilting trailer is a motorcycle trailer. A basic motorcycle trailer design may consist of a fixed platform mounted above one or more axles, which requires the motorcycle to be loaded by physically lifting the motorcycle or rolling it up a ramp onto the platform, both of which may present a difficult problem when dealing with a heavy touring machine or one that has been disabled. A number of different trailer styles may be used to make loading motorcycles easier. Broadly, such designs include tilt and drop bed designs. With a tilt-bed design, the platform teeters on the axle, bringing the tail of the trailer to ground level. The motorcycle is pushed or ridden onto the trailer bed, which may automatically tilt back to the horizontal and lock in place when the load moves forward of the bed pivot point. Such designs may require the machine be pushed up an inclined plane. With a drop-bed design, the platform may be lowered to the ground in a substantially horizontally fashion and the motorcycle rolled or ridden over the lip of the platform and secured to it. Thereafter, the entire platform and load may be raised and secured for towing. Such designs may still require the machine (motorcycle) to be raised by at least the thickness of the platform, which is typically less than 10 cm (4 in). The motorcycle may be loaded either via the rear end or the sides of the trailer deck.

Figure 1:
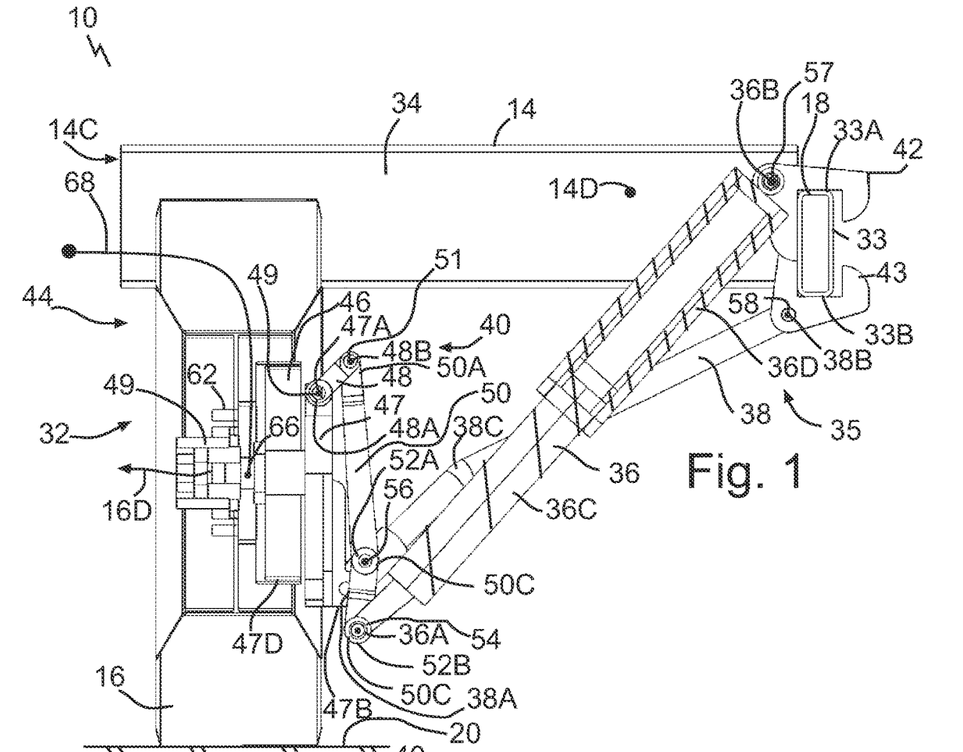
FIG. 1 is a cross-sectional view of a kneeling wheel assembly secured to a trailer chassis and shown in an upright, deployed position.
Figure 2:
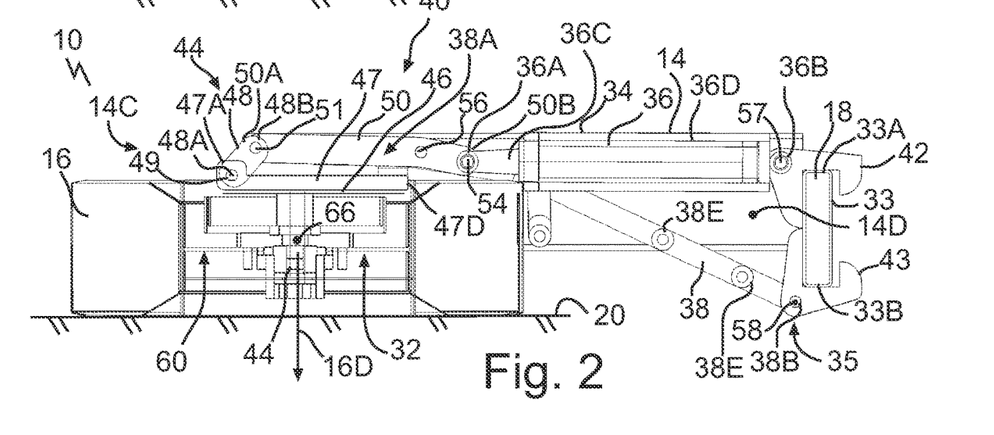
FIG. 2 is a cross-sectional view of a kneeling wheel assembly secured to a trailer chassis and shown in a facedown, kneeling position.
Figure 3:
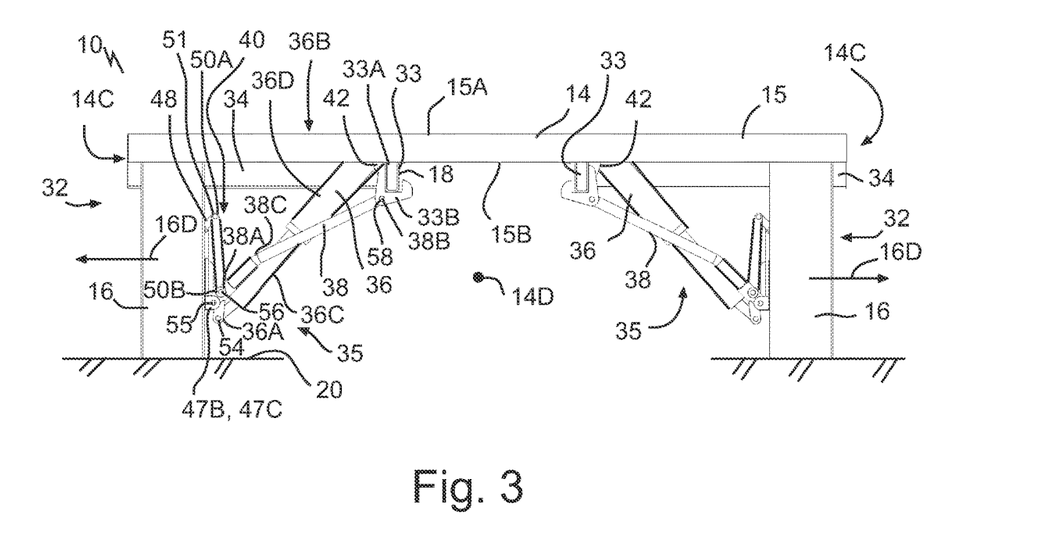
FIG. 3 is a rear end view of a trailer that incorporates a pair of the kneeling wheel assemblies of FIG. 1, shown in the upright position.
Figure 4:
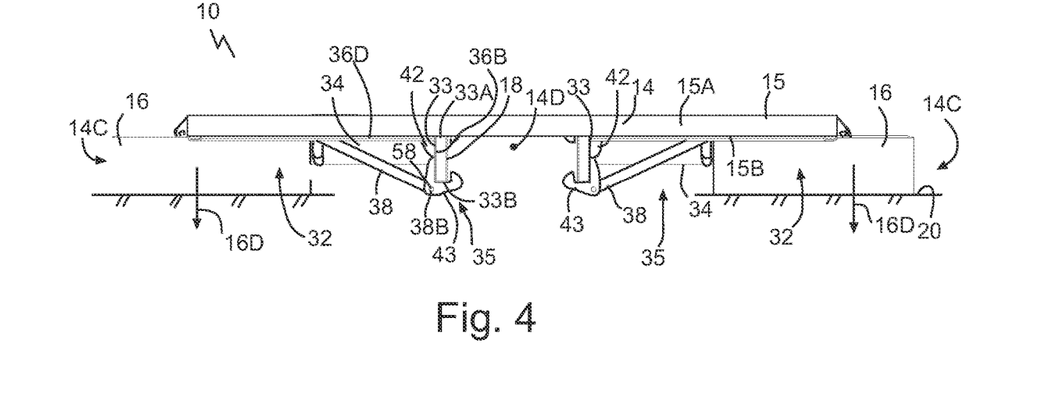
FIG. 4 is a rear end view of a trailer that incorporates a pair of the kneeling wheel assemblies of FIG. 1, shown in the kneeling position.
Figure 5:
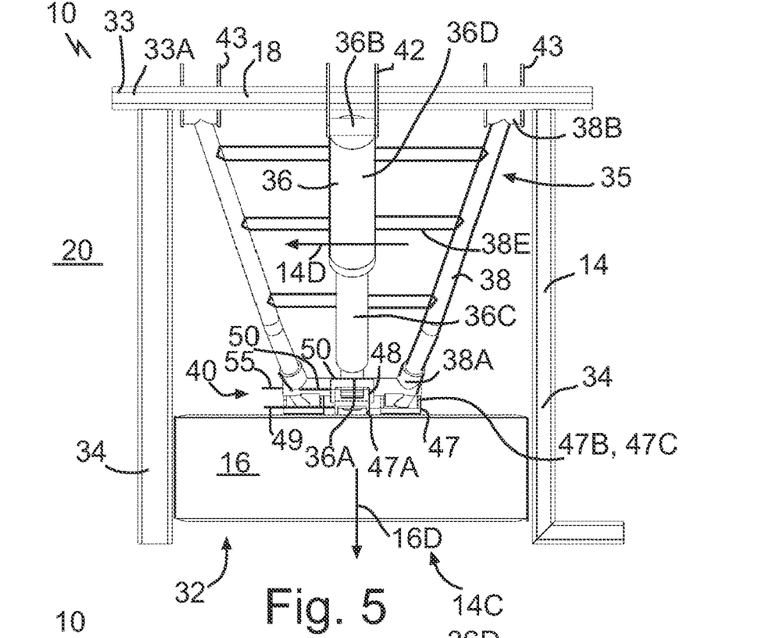
FIG. 5 is a top plan view of a trailer that incorporates a pair of the kneeling wheel assemblies of FIG. 1, shown in the upright position.
Figure 6:
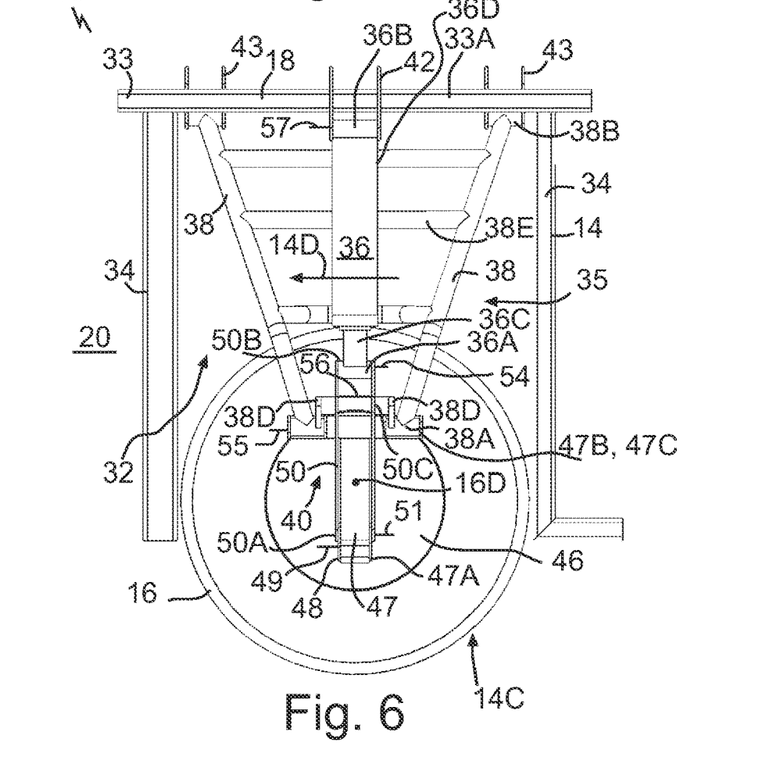
FIG. 6 is a top plan view of a trailer that incorporates a pair of the kneeling wheel assemblies of FIG. 1, shown in the kneeling position.

Referring to FIGS. 1-10, a wheel assembly 10 is illustrated, comprising a ground engaging wheel 16, a wheel mount 46, a control arm 38, and an actuator 36. The wheel assembly 10 may be mounted on a chassis 18, which may form part of a trailer 14 (for example if the chassis 18 mounts a trailer deck 15). Each ground engaging wheel 16 may be mounted in cantilever fashion to the chassis by the control arm 38 and actuator 36. The control arm 38 may be pivotally connected between the wheel mount 46 and a chassis 18 or a control arm chassis mount, such as a chassis control arm bracket 43. The actuator 36 may be pivotally connected between the wheel mount 46 and the chassis 18 or an actuator chassis mount, such as an actuator bracket 42. Referring to FIGS. 3-4, if the wheel assembly 10 is mounted in use to the chassis 18, there may be one or more, for example a pair, of wheel assemblies 10. Plural wheel assemblies 10 may be mounted at opposed sides of the chassis 18 (such as opposed sides 14C of the trailer 14 shown), although in some cases the wheel assemblies 10 may be staggered relative to one another rather than mounted directly opposite one another along an axis perpendicular to an axis 14D of vehicle travel. Wheels may be staggered from side to side to reduce impacts to the load due to perpendicular bumps in the road.

Figure 11:
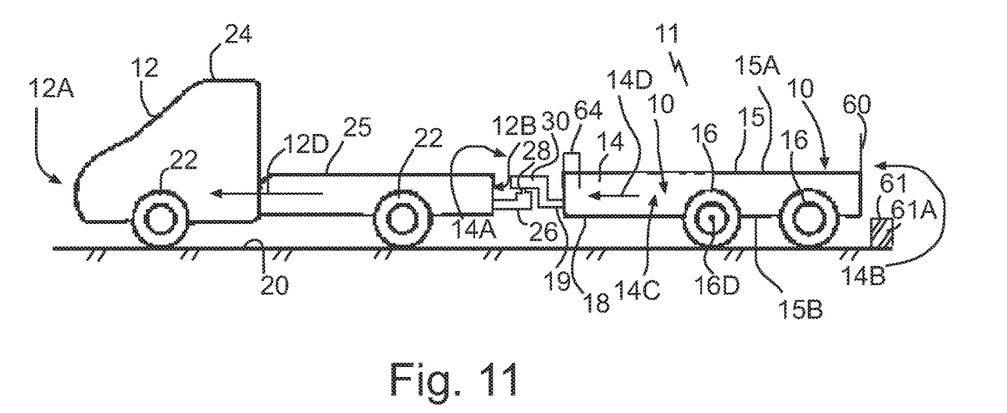
FIG. 11 is a side elevation simplified view showing a tow vehicle towing a utility trailer that incorporates four kneeling wheel assemblies, shown in the upright position.
Figure 12:
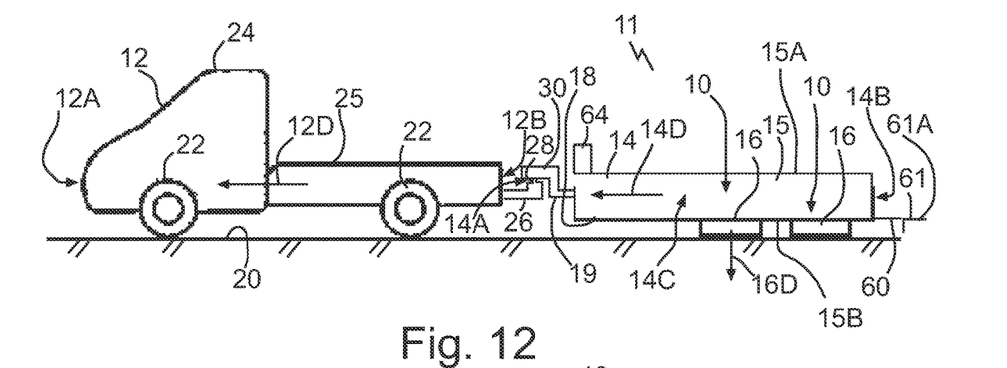
FIG. 12 is a side elevation simplified view showing the tow vehicle and utility trailer of FIG. 11 with the four kneeling wheel assemblies shown in the facedown, kneeling position, and with a rear end gate deployed.

Referring to FIGS. 11 and 12, the chassis 18 may form part of a trailer 14, which may be coupled to a tow vehicle 12. The trailer 14 may define a front end 14A, a rear end 14B, opposed sides 14C. The tow vehicle 12 may define a front end 12A, a rear end 12B, and sides. A tow vehicle 12 may take any of a variety of suitable forms, such as a car, an SUV, a truck (shown), or other forms. In the example shown the tow vehicle 12 has a cab 24 and a truck bed 25. The tow vehicle 12 and trailer 14 may have suitable wheels 22 and 16, respectively. In use the vehicle 12 and trailer 14 may define respective axes 12D and 14D of travel, which are coaxial when the vehicle 12 and trailer 14 are moving in a straight line forward. The wheels 22 and 16 of the vehicle 12 and trailer 14 may be aligned in planes that are parallel to the respective axes 12D and 14D of travel and (ignoring any camber) perpendicular to a ground surface 20 in use. An axis 16D of rotation of the wheels 16 may (ignoring any camber) be perpendicular to the axis 14D of travel and parallel with the ground surface 20 in use. The trailer 14 may incorporate walls, such as fencing, or a perimeter rim, with or without gates, or no walls or rim may be present. The trailer 14 may incorporate tie downs or tie down mounts.

Referring to FIGS. 11 and 12, the tow vehicle 12 and trailer 14 may couple via a suitable tow connection. The tow vehicle 12 may have a hitch 26, such as a ball hitch 28, to which a suitable hitch receiver 30 of the trailer 14 may connect to. The hitch may be a variable height or fixed height hitch. The trailer 14 may have a tongue 19 that mounts receiver 30. The hitch connection may be structured to permit pivoting of the trailer 14 relative to the tow vehicle 12 in use. A tow hitch (or tow bar) may be a device attached to the chassis of a vehicle for towing, or a towbar to an aircraft nose gear. It can take the form of a tow ball to allow swiveling and articulation of a trailer, or a tow pin, or a tow hook with a trailer loop, often used for large or agricultural vehicles where slack in the pivot pin allows similar movements. Another category is the towing pintle, which incorporates a lunette ring and hook.

Referring to FIGS. 1-10, the wheel assemblies 10 may be operated to lower and raise the chassis 18 in use. For each wheel assembly 10, the actuator 36 may be operable to, in use, cause the respective ground engaging wheel 16 to move between an upright position (FIGS. 1, 3, 5, 7, and 9) and a facedown position (FIGS. 2, 4, 6, 8, and 10). The actuator 36 may cause the wheel 16 to pitch down with increasing camber from the upright position into the facedown position to lower the chassis 18 in use. The actuator 36 may be operated to cause the wheel 16 to pitch up with decreasing camber from the facedown position into the upright position to raise the chassis 18 in use. Camber angle may be defined as the angle made by the wheels of a vehicle between the vertical axis of the wheels and the vertical axis of the vehicle when viewed from the front or rear. If the top of the wheel is farther out than the bottom (that is, away from the axle), it is called positive camber. If the bottom of the wheel is farther out than the top, it is called negative camber.

Referring to FIGS. 1-2 and 11-12, the wheels 16 may remain in contact with ground surface 20 throughout a range of motion from upright to facedown and back to upright. The apparatus may be structured such that the ground engaging wheels 16 contact a ground surface 20 and bear a weight of the chassis 18 when pitching between the facedown position and the upright position. By remaining in contact with the ground surface 20 the pitching of the wheels 16 is able to raise and lower the frame or chassis 18. In some cases, the actuators 36 may be precisely controlled to a sufficient degree to provide a range of motion, such as a range of infinite or discrete positions of pitch (camber angle) between upright and facedown positions, in order to adjust a height of a trailer deck 15 as needed. In other cases the wheels do not touch the ground during positioning or while face down, for example if the wheels pitch while other wheels or ground supports support the chassis 18, in the case of a lift axle.

Referring to FIGS. 11 and 12, a range of positions may be advantageous when attempting to adjust a height of a trailer deck 15 (for example a height to a top surface 15A opposite a bottom surface 15B of deck 15) or other surface of a vehicle flush to an adjacent external platform 61 from which loading or unloading may occur from or onto, respectively. In the example shown lowering or raising further comprises lowering or raising the trailer deck 15 to a top surface 61A of the platform 61 (loading dock). The trailer deck 15 may remain level during raising or lowering, for example when using a variable height hitch or unhitching from the towing vehicle—in some such cases the trailer may be set level on the ground or raised to a higher setting while remaining level.

Referring to FIGS. 11 and 12, the trailer 14 or vehicle may incorporate a ramp 60. The ramp 60 may form a gate as shown, such as a rear end gate, or a side or front gate as the case may be. In the example shown, the ramp 60 is located at the rear end 14B of the trailer 14 or trailer deck 15. By lowering the trailer deck 15, the angle of a deployed ramp 60, between the ramp 60 and the ground surface 20, will be relatively shallower than if the trailer 14 were not lowered. By reducing the deployment angle, the loading and unloading of the trailer 14 may be carried out in a safer, more convenient fashion. In some cases, the system or apparatus 11 may eliminate the use of loading ramps (eliminates the risk of them bending or shifting).

Figure 13:
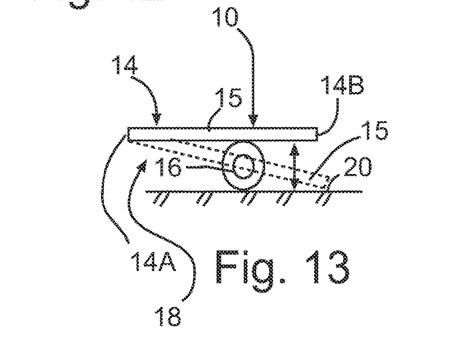
FIG. 13 is a side elevation simplified view showing a tilting trailer incorporating the wheel assemblies of FIG. 1, with a raised and tilted position shown in solid and dashed lines, respectively.

Referring to FIG. 13, in some cases the wheel assemblies 10 may be used to provide tilt to the chassis 18. For example, lowering may further comprise lowering to tilt a rear end 14B of the chassis 18 down relative to a front end 14A of the chassis 18 (in this case trailer 14). Tilting may occur if the wheel assemblies 10 define a pivot point for the chassis 18, for example if a hitch height is fixed at the front end 14A of the trailer 14. Tilting by lowering the wheel base may reduce the slope of the trailer deck 15 relative to an example where the trailer 14 is tilted without lowering the wheel base. Thus, the assembly 10 may allow the lowering of the tail of a trailer to touch the ground at a low approach angle. Tiltability may allow the trailer or vehicle to be tilted to one side or the other to allow the trailer to be loaded or unloaded from the side.

Referring to FIGS. 1-4, the pitching of the wheels 16 may be such to maintain the wheels 16 under the trailer deck 15 or vehicle at all times. In the example shown the control arm 38 and actuator 36 mount to axial beams 33 of the chassis 18, with beams 33 and lateral beams 34 collectively forming a structural frame that supports the deck 15. The ground engaging wheels 16 may be structured to remain under the trailer deck 15 when in both the upright position and the facedown position. Such may avoid a need for placing the wheels 16 within respective cutouts in the trailer deck 15, as is done in many conventional trailers of which it is desired to lower the operating height of the trailer deck without reducing wheel size. However, when the wheels 16 are placed within such cutouts, the lateral width of the trailer deck 15 is reduced, reducing the cargo capacity accordingly. Thus, by permitting the wheels 16 to pitch up or down below the trailer deck 15, it is possible to use a continuous trailer deck 15 as shown that overlies the wheels 16 regardless of their pitch or position, thus maximizing cargo area as well as ride height. Such may allow for the use of a full width trailer deck (legally limited to 8.5 ft in Canada and the U.S. without a permit) while still being able to lower the tail of the trailer to the ground. Such may allow for the full access to the sides of flat deck trailers (fenders and tires do not get in the way of loading the deck from the side). The tires may be protected at least partially from ultraviolet (UV) light and other elements during storage by laying the tires down under the deck, chassis, and/or vehicle body.

Various of the assemblies 10 and the overall apparatus 11 may allow for the alteration of ride heights of the vehicle/trailer. Higher ground clearance may be achieved than with standard axle systems. Reducing the upper height of the trailer when loading may increase operator comfort and safety. Such may remove inner fender intrusion into enclosed, livestock, and camper trailers and vehicles. Permitting the adjustment of ride or travel height may be used for various purposes, such as to reduce aerodynamic drag (by lowering), increase ground clearance (by raising), and reduce clearance height (by lowering) for travelling under bridges or other overhead obstructions. The apparatuses may provide the ability to change the height of the trailer or vehicle cargo or passenger area when loading or unloading in order to increase operator, passenger, or animal comfort and safety during use. Adjusting of height allows the shipping of multiple trailers stacked without removing the tires, by reducing storage height.

Referring to FIGS. 1-10 each wheel assembly 10 may operate independently. For example, each wheel assembly 10 may be mounted to the chassis 18 in use independent of the other wheel assemblies 10. In some cases, the individual actuators 36 of each assembly 10 may be controlled independent of the actuators of the other assemblies 10, although in other cases the operation of the actuators 36 may be ganged for level and consistent group response. Independent assemblies 10 may improve handling, for example in the same fashion as independent suspension, by isolating each wheel 16 from the other wheels to compensate for uneven terrain or bumps in the road surface 20. Independent operation of each actuator 36 may permit the trailer 14 or vehicle to be levelled when sitting on a slope, or to be otherwise adjusted in pitch across different degrees of freedom to provide a desired height or tilt depending on loading and unloading context.

Referring to FIGS. 1-10, each wheel assembly 10 may incorporate a suitable wheel mount 46. The mount 46 may be mounted to the wheel 16 to permit the wheel 16 to rotate relative to the mount 46. The wheel mount 46 permits the wheel 16 to rotate relative to the wheel mount 46, with the wheel mount 46 remaining rotationally static relative to the chassis 18 in use. Referring to FIGS. 1 and 2, the wheel mount 46 may comprise a hub carrier that mounts a wheel hub 62, which rigidly affixes to a tire (such as a rubber tire) that forms the wheel 16. The wheel mount 46 may incorporate a spindle 44 or other axle, or may incorporate a hub for mounting a spindle 44 or axle that extends from the wheel 16 itself. The spindle 44 may be passive (shown) or driven in the case of chassis 18 being part of a driven vehicle. The mount 46 may incorporate bearings and other parts as needed to achieve functionality. Wheel mounts may thus be motorized for additional traction, low speed maneuvering, energy recovery, etc. The spindle may be structured to be removable to simplify repair if damaged.

Referring to FIGS. 1-10, a mechanical linkage may be used to mount the control arm 38 and actuator 36 to the wheel 16 for the desired pitching function. A mechanical linkage may include an assembly of bodies (such as links) connected to manage forces and movement. The movement of a body, or link, is studied using geometry and the link may be considered to be rigid. The connections between links in some cases provide ideal movement, pure rotation or sliding for example, and may be called joints. A linkage modeled as a network of rigid links and ideal joints may be called a kinematic chain.

Referring to FIGS. 1-10, the mechanical linkage may be closed chain. For each wheel assembly 10, the control arm 38 and the actuator 36 may pivotally connect to the wheel mount 46 via a closed chain linkage 40 mounted to the wheel mount 46. Linkages may be constructed from open chains, closed chains, or a combination of open and closed chains. Each link in a chain may be connected by a joint to one or more other links. For each wheel assembly 10, the closed chain linkage 40 may comprise a suitable number of links, such as a four bar linkage shown. The four bar linkage shown may form a folding quadrilateral. The four bar linkage may be formed by the wheel mount 46 (for example a base link 47 rigidly mounted to the wheel mount 46), an elongate link 50, and a pair of bridge links (link 48 and cam stem 38D in the example shown). The bridge links may pivotally connect the elongate link to permit the elongate link to float relative to the wheel mount 46. The characterizing of link 50 as elongate merely refers to the link 50 having longer length dimensions than the bridge links, as such may provide the linkage 40 with a relatively lower profile against the rear face of the wheel mount 46 than if the bridge links were longer. The base link 47 may have similar length dimensions (length defined between respective joints) as the link 50. A low profile may be advantageous particularly when in the facedown position in order to minimize a distance between the trailer deck 15 and the ground surface 20. In some cases, the link 50 is not elongate.

Figure 7:
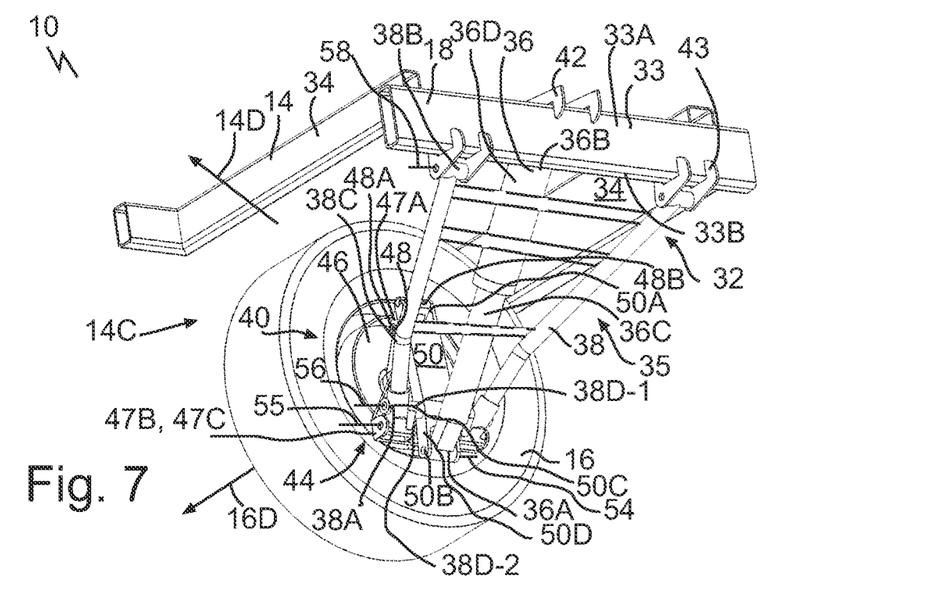
FIG. 7 is a bottom perspective view of a trailer that incorporates a pair of the kneeling wheel assemblies of FIG. 1, shown in the upright position.
Figure 8:
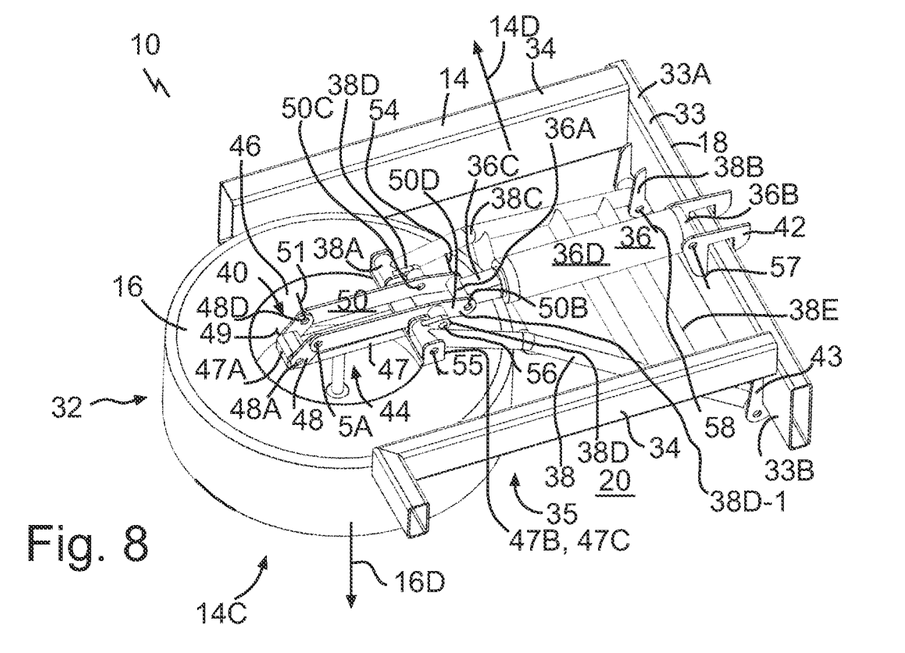
FIG. 8 is a top perspective view of a trailer that incorporates a pair of the kneeling wheel assemblies of FIG. 1, shown in the kneeling position.
Figure 9:
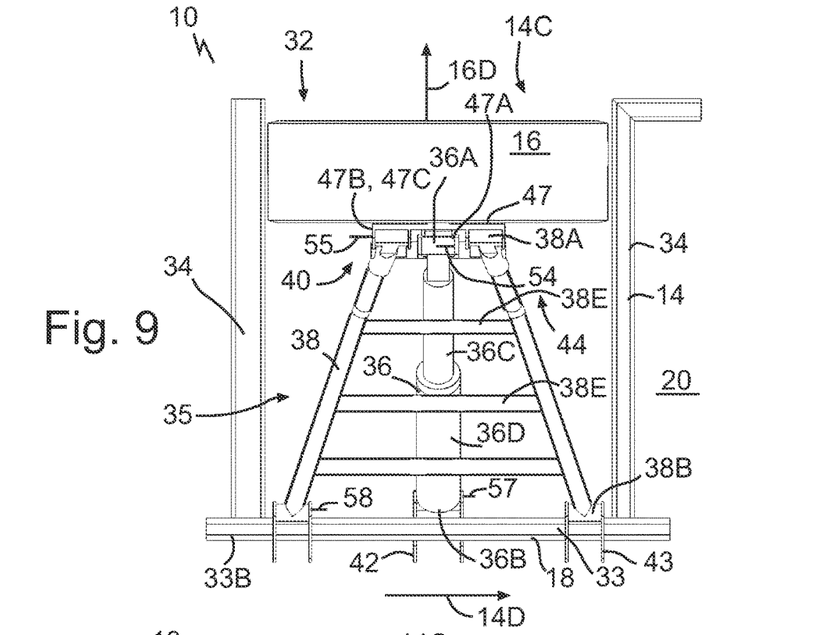
FIG. 9 is a bottom plan view of a trailer that incorporates a pair of the kneeling wheel assemblies of FIG. 1, shown in the upright position.
Figure 10:
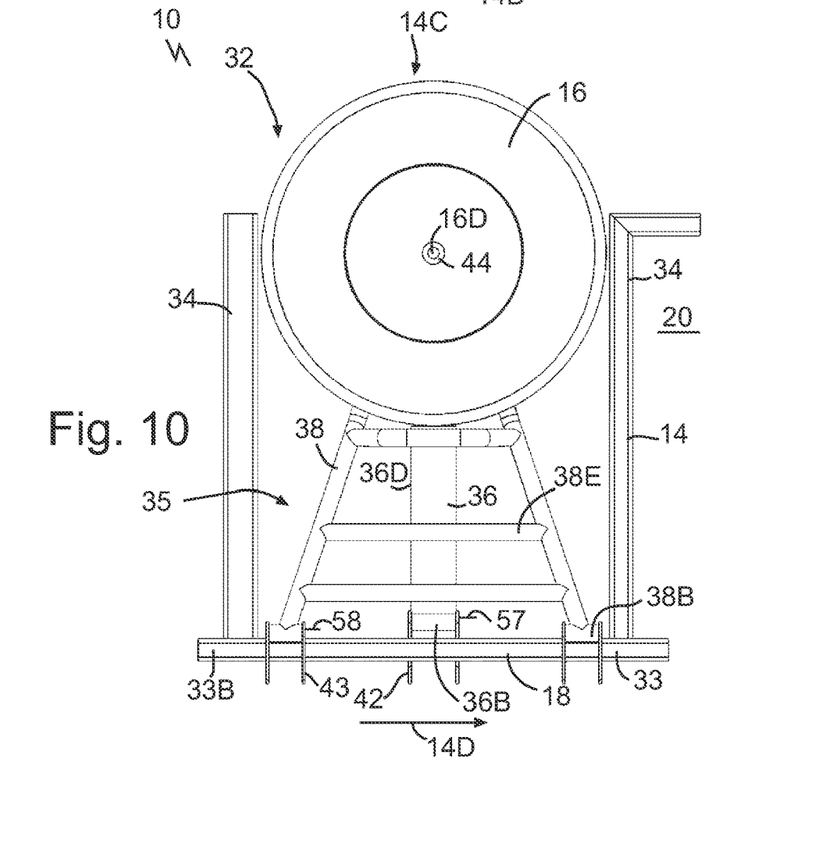
FIG. 10 is a bottom plan view of a trailer that incorporates a pair of the kneeling wheel assemblies of FIG. 1, shown in the kneeling position.

Referring to FIGS. 1-10, the linkage 40 may be structured to move in a suitable fashion. In the example shown the base link 47 mounts vertically to a rear face of the wheel mount 46. Respective joints at upper and lower ends 47A and 47B of the link 47 may define pivot axes 49 and 56, respectively, which are parallel to the axis 14D of trailer travel (ignoring any caster provided). The upper bridge link 48 may define first and second ends 48A and 48B, which mount to end 47A of link 47 and first end 50A of elongate link 50, respectively. Referring to FIGS. 7-8, the elongate link 50 may define an intermediate point 50C, which mounts to an end 38D-1 of cam stem 38D (the second bridge link). The cam stem 38D may define a second end 38D-2, which mounts to end 47B of link 47, completing the linkage 40.

Referring to FIGS. 1-10, for each wheel assembly 10, the control arm 38 may pivotally connect to a joint of the four bar linkage 40. In the example shown such is achieved via a cam stem 38D. The control arm 38 may form a crank that pivotally connects to the wheel mount 46, to define a control arm joint of the four bar linkage 40, for example by end 38A of the control arm 38 pivotally connecting to wheel mount 46, for example via base link 47. In the example shown, base link 47 mounts end 38A via a mounting fork 47C. In the example shown, two control arms 38 may be provided, with each having respective ends 38A that mount within respective mounting forks 47C of link 47. Each control arm 38 may form a cam stem 38D of the crank forming one of the pair of bridge links and pivotally connecting to the elongate link 50. Thus, as control arm 38 is rotated about a pivot axis 55 defined as the joint between arm 38 and link 47, the cam step 38D rotates, moving elongate link 50 accordingly relative to base link 47.

Referring to FIGS. 1-10, the actuator 36 may pivotally connect to linkage 40 via a suitable fashion. In order to provide sufficient rigidity for operation, the linkage 40 may have two connection points to the chassis 18—in this case provided by control arm 38 and actuator 36. Referring to FIGS. 7 and 8, in the example shown, for each wheel assembly 10, the actuator 36 pivotally connects to an actuator crank stem 50D extended from link 50 of the four bar linkage 40. The crank stem 50D may extend off the link 50 to define a second end 50B of the link 50. In the example shown, in the upright position the crank stem 50D extends downward from the intermediate point 50C and the first end 50A of link 50. An end 36A of the actuator 36 may connect to the crank stem 50D. A second end 36B defined by the actuator 36 may pivotally connect to the bracket 42. A pivot axis 54 defined between the crank stem 50D and the actuator 36 may be parallel to the axis 14D of trailer travel.

Referring to FIGS. 1-10 the wheel assembly 10 may be structured to pitch the top of the wheel 16 laterally outward and down when moving from upright to facedown. Referring to FIG. 1, for each wheel assembly 10, the actuator 36 may pivotally connect to the wheel mount 46 at an actuator connection point (for example defined by pivot axis 54) at or near a base end 47D of the wheel mount 46 below a central spin axis 16D of the wheel 16 when in the upright position (FIG. 1). For each wheel assembly 10, the control arm 38 may pivotally connect to the wheel mount 46 at a control arm connection point (for example defined by pivot axis 56) above the actuator connection point (pivot axis 54) and below the central spin axis 16D of the wheel 16 when in the upright position. Thus, operation of the actuator 36, which may be a linear actuator as shown, may pitch the wheel 16 laterally outward with increasing camber from upright to facedown.

Referring to FIGS. 1 and 2, a suitable actuator 36 may be used. The actuator 36 may comprise a linear actuator, in which case extension and retraction of the actuator 36 may provide the operative kinetic energy input to pitch the wheel 16. As shown, the actuator 36 may extend in length to move the wheel 16 from facedown to upright, and may retract in length to move the wheel 16 from upright to facedown, although this may be reversed in other cases. A linear actuator may include a hydraulic actuator (shown), a screwjack, a worm gear system, a pneumatic actuator, or other suitable actuators. A hydraulic actuator may incorporate a piston 36C and cylinder 36D, and although the example shown has the piston 36C form end 36A and cylinder 36D forming second end 36B, this orientation may be reversed. Referring to FIGS. 11 and 12, a hydraulic actuator may require a hydraulic power system 64, which may incorporate a suitable hydraulic fluid reservoir, supply and return lines, valving, and controls as required to carry out the desired function of the actuator 36. When not in use the hydraulic power system 64 may be used for other features unrelated to the operation of the actuator 36. Pneumatic or liquid hydraulics may be used. Thus, the hydraulic/pneumatic system may be used to power other devices (e.g. tools, winches, crane, powered jack, moving system for when the trailer is not attached to a vehicle, etc.).

Referring to FIGS. 1-2 and 7-8, the control arm 38 may incorporate suitable features. For compactness, one or both the actuator 36 or control arm 38 may be bent or curved. In the example shown, control arm 38 may be bent, for example with a bend vertex 38C structured to define a wheel receiving cavity to permit the control arm 38 to, when in the facedown position, reach around to the rear face of the wheel mount 46 without obstructing the wheel 16.

Referring to FIGS. 1 and 2, each wheel assembly 10 may be structured for a low profile when in the facedown position. Each wheel assembly 10 may be structured such that when moving from the upright position to the facedown position, respective wheel mounting ends 38A and 36A of the control arm 38 and actuator 36 pitch up toward the chassis 18. By converse, when moving from the facedown position to the upright position, the respective wheel mounting ends 38A and 36A of the control arm 38 and actuator 36 may pitch down away from the chassis 18. Referring to FIGS. 3 and 4, for each assembly 10, the control arm 38 and actuator 36 may depend from an intermediate position (defined by brackets 42 and 43), between the opposed sides 14C of, and under, the chassis 18. The arm 38 and actuator 36 may extend laterally outward from the intermediate position, in both the upright and facedown positions, to mount and connect to the wheel mount 46, for example in cantilever fashion. In some cases, the control arm 38 is itself a second actuator, so that the two sets of actuators cooperate to pitch the wheel 16 as desired, for example with minimal lateral movement of the wheel 16.

Referring to FIGS. 1 and 2, each wheel assembly 10 may be structured so that the wheel 16 rotates about an axis or axis path, parallel to the axis 14D of travel of the trailer 14, that cuts through the wheel mount 46 or wheel 16 itself, for minimal lateral displacement of the wheel 16 during repositioning. Each wheel assembly 10 may be structured such that when moving from the upright position to the facedown position a central camber axis 66, of the ground engaging wheel 16, that is defined parallel with an axis 14D of travel of the chassis, travels relatively up toward the chassis 18 and laterally outward while the wheel 16 pitches with increasing camber (upright to facedown), for example along a path 68. The wheel 16 may rotate (pitch) about the axis 66 while the axis 66 traverses the path 68. A top of the wheel 16 may move laterally outward, and a bottom of the wheel 16 laterally inward, relative to the chassis 18, to pitch down to facedown. By converse, when the wheel 16 pitches with decreasing camber (facedown to upright), the axis 66 may travel relatively down away from the chassis 18 and laterally inward. A top of the wheel 16 may move laterally inward, and a bottom of the wheel 16 laterally outward, relative to the chassis 18, to pitch down to upright. When viewing a wheel from behind on a left side of the trailer, the wheel 16 may pitch counter clockwise and clockwise moving from upright to facedown and facedown to upright, respectively. When viewing a wheel from behind on a right side of the trailer, the wheel 16 may pitch clockwise and counter clockwise moving from upright to facedown and facedown to upright, respectively. In some embodiments, the camber axis travels laterally inward if the control arm is mounted to pivot above the spin axis of the wheel.

A locking system (not shown) may be provided to lock the wheels 16 in a desired camber position between and including the upright and facedown positions. In some cases, the suspension may be locked in place when the deck is off the ground so the height of the trailer does not change. A locking system may be used when on a parked camper to prevent trailer movement due to people moving or wind or when the trailer is being loaded at a dock by forklift. In addition, lowering the vehicle/trailer frame to the ground may create friction between the frame and the ground and acts like a parking brake as well as increases the stability of the unit.

The assembly 10 may incorporate a suitable suspension system. The wheel assembly 10 may incorporate a suspension system, such as a strut. The actuator 36 may operate as a suspension system or part of it. A double wishbone suspension system may be used. Multiple hydraulic shocks/springs may be tied together to allow the force to be spread evenly over the frame and reduce point loading. The hydraulic shocks/springs may be separated from each other to allow for varying force and position (e.g. separating left from right to level an uneven load and prevent roll, separating front from rear to adjust the hitch weight, etc.). Each suspension system may be separate from the others allowing higher control of contact patch of the tire which leads to more grip, smoother ride, and less tire wear. The actuator 36 may provide a dampening effect on suspension movement. In some cases the system prevents or restricts longitudinal movement and rotational movement about the vertical and lateral axis unlike traditional leaf, torsion, or air springs, thus reducing swaying, increasing braking, and generally improving control. The suspension may have a variable spring force to reduce the shock loading unlike typical existing solutions.

In some cases, the wheel 16 may pitch with decreasing camber from upright into the facedown position. The wheel assembly 10 may be steerable. Making the axle steerable may allow it to be used as one or more of a front axle on a vehicle to lower the front of a vehicle or a rear axle to create a rear steer vehicle that can lower the rear of a vehicle. Making the axle steerable may allow it to be used on trailers with three or more axles or trailers with wide axle spacing. The wheel assembly 10 may incorporate a king pin or other conventional components. The wheel assembly 10 may be powered. The actuator 36 may be used to adjust camber settings for the wheel 16 for driving. The wheel assembly 10 may be mounted on a trailer or other vehicle. The assembly 10 may incorporate brakes such as disc brakes or drum brakes. The chassis 18 may be that of a recreational vehicle (RV), which may be powered or towed. A suitable closed chain linkage or hybrid (closed and open) linkage may incorporate more than 4 bars (links), for example five or more. Pivotal connection means the ability for connected parts to rotate relative to one another. Words such as up, down, left, right, above, and below are relative and not to be taken as absolute values defined with respect to the direction of gravitational acceleration on Earth unless context dictates otherwise. The assembly 10 may be used as a lift axle, for example to permit tires to be raised off the ground to reduce tire and suspension wear and improve ride and handling in light load situations or make changing a tire easier. However, the raising/lowering use of the disclosed system may be an improvement on traditional lift axles since the tires may be higher off the ground which will reduce hang up and aero drag as well as eliminating flat spotting. The apparatus 11 may be scalable to higher or lower load ratings. On-board electronics and sensors may be included to make the suspension perform self-adjusting functions such as load leveling, adjusting for a change in the amount of load, speed change (drag reduction), load tipping in a curve, terrain roughness, etc. Adding an actuator to compensate for camber may reduce tire wear, increase grip, and allow for a smoother ride. The apparatus 11 may be used in rail applications to lower the vehicle on to rail bogies or lower rail bogies to lift up vehicle. If a trailer is used the trailer may be open or closed.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus comprising:
   a chassis;
   wheel assemblies at opposed sides of the chassis, each wheel assembly having:
   a ground engaging wheel;
   a wheel mount;
   a closed chain linkage mounted to the wheel mount and comprising a four bar linkage forming a folding quadrilateral;
   a control arm pivotally connected between the wheel mount and the chassis via the closed chain linkage; and
   an actuator pivotally connected between the wheel mount of the ground engaging wheel and the chassis via the closed chain linkage;
   in which the actuator is operable to, in use, cause the ground engaging wheel to:
   pitch down with increasing camber from an upright position into a facedown position; and
   pitch up with decreasing camber from the facedown position into the upright position.

2. The apparatus of claim 1 in which, for each wheel assembly, the control arm pivotally connects to a joint of the four bar linkage.

3. The apparatus of claim 1 in which, for each wheel assembly, the actuator pivotally connects to an actuator crank stem extended from a link of the four bar linkage.

4. The apparatus of claim 1 in which the four bar linkage comprises the wheel mount, an elongate link, and a bridge link pivotally connecting the elongate link to float relative to the wheel mount.

5. The apparatus of claim 4 in which, for each wheel assembly, the control arm forms a crank that pivotally connects to the wheel mount to define a control arm joint of the four bar linkage, with a cam stem of the crank forming one of a pair of bridge links and pivotally connecting to the elongate link.

6. The apparatus of claim 5 in which, for each wheel assembly, the actuator pivotally connects to a crank stem of the elongate link.

7. The apparatus of claim 1 in which, for each wheel assembly:
   the actuator pivotally connects to the wheel mount at an actuator connection point at or near a base end of the wheel mount below a central spin axis of the wheel when in the upright position; and
   the control arm pivotally connects to the wheel mount at a control arm connection point above the actuator connection point and below the central spin axis of the wheel when in the upright position.

8. The apparatus of claim 1 in which the actuator is operable to, in use, cause the ground engaging wheel to:
   pitch down with increasing camber from the upright position into the facedown position to lower the chassis; and
   pitch up with decreasing camber from the facedown position into the upright position to raise the chassis.

9. The apparatus of claim 1 forming one or more of:
   a vehicle; or
   a trailer.

10. The apparatus of claim 9 in which the ground engaging wheels are structured to remain under the trailer when in both the upright position and the facedown position.

11. The apparatus of claim 10 further comprising a ramp at a side or end of the trailer.

12. The apparatus of claim 9, in which the chassis mounts a trailer deck.

13. The apparatus of claim 1 in which the control arm and actuator depend from an intermediate position, between the opposed sides of, and under, the chassis, and extend laterally outward from the intermediate position, in both the upright and facedown positions, to mount and connect to the wheel mount.

14. The apparatus of claim 13 in which each wheel assembly is structured such that:
   when moving from the upright position to the facedown position, respective wheel mounting ends of the control arm and actuator pitch up toward the chassis; and
   when moving from the facedown position to the upright position, the respective wheel mounting ends of the control arm and actuator pitch down away from the chassis.

15. The apparatus of claim 1 in which each wheel assembly is structured such that when moving from the upright position to the facedown position a central camber axis, of the ground engaging wheel, that is defined parallel with a direction of travel of the chassis, travels relatively up toward the chassis and laterally outward while the wheel pitches with increasing camber.

16. A method of operating the apparatus of claim 1, the method comprising:
   lowering the chassis by operating the actuators to pitch the ground engaging wheels down into the facedown position; and
   raising the chassis by operating the actuators to pitch the ground engaging wheels up into the upright position.

17. A method comprising:
   lowering a chassis, which has a pair of ground engaging wheels mounted at opposed sides of the chassis, with each ground engaging wheel having a four bar linkage forming a folding quadrilateral and being mounted in cantilever fashion to the chassis by a control arm and an actuator, in which the control arm and actuator pivotally connect to the ground engaging wheel via the four bar linkage, in which lowering comprises operating the actuators to pitch the ground engaging wheels down into a facedown position; and
   raising the chassis by operating the actuators to pitch the ground engaging wheels up into an upright position.

18. The method of claim 17 in which the chassis forms a trailer.

19. The method of claim 18 in which lowering further comprises lowering or raising to tilt a side or end of the chassis down or up, respectively.

20. The method of claim 18, in which the chassis mounts a trailer deck.

* * * * *